US008357026B2

(12) United States Patent
Manuel et al.

(10) Patent No.: US 8,357,026 B2
(45) Date of Patent: Jan. 22, 2013

(54) RETREAD TIRE BUFFING WITH MULTIPLE RESPONSE CURVES

(75) Inventors: Stephen Manuel, Flat Rock, NC (US); Robert Young, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 775 days.

(21) Appl. No.: 12/593,233

(22) PCT Filed: Mar. 29, 2007

(86) PCT No.: PCT/US2007/065522
§ 371 (c)(1),
(2), (4) Date: Sep. 25, 2009

(87) PCT Pub. No.: WO2008/121141
PCT Pub. Date: Oct. 9, 2008

(65) Prior Publication Data
US 2010/0130099 A1   May 27, 2010

(51) Int. Cl.
*B24B 49/04* (2006.01)
(52) U.S. Cl. .............................. 451/5; 451/49
(58) Field of Classification Search ............. 451/5, 8, 451/28, 58, 49, 178, 451, 456
See application file for complete search history.

(56) References Cited

U.S. PATENT DOCUMENTS

| 3,553,903 A | 1/1971 | Christie |
| 3,574,973 A | 4/1971 | Rader |
| 3,633,279 A | 1/1972 | Frazier et al. |
| 3,675,706 A | 7/1972 | Cahill |
| 3,724,137 A | 4/1973 | Hofelt, Jr. et al. |
| 3,941,178 A | 3/1976 | Simpson et al. |
| 4,062,716 A | 12/1977 | Galantine et al. |
| 4,084,350 A | 4/1978 | Ongaro |
| 4,126,171 A | 11/1978 | Sorenson |
| 4,736,546 A | 4/1988 | Ugo |
| 4,914,869 A | 4/1990 | Bayonnet et al. |
| 5,005,628 A | 4/1991 | Kinuhata et al. |
| 5,022,186 A | 6/1991 | Rogers, Jr. |

(Continued)

FOREIGN PATENT DOCUMENTS
EP   1 189 014 A2   3/2002
(Continued)

OTHER PUBLICATIONS

JP 08-304009 A—English abstract and machine translation obtained from Patent Abstracts of Japan (http://www19.ipdl.inpit.go.jp) accessed on May 21, 2012, 10 pages.

(Continued)

*Primary Examiner* — Robert Rose
(74) *Attorney, Agent, or Firm* — Hahn Loeser & Parks LLP; Bret A. Hrivnak, Esq.

(57) ABSTRACT

A method and apparatus for buffing tread from a tire carcass, the method comprising the steps of: receiving a signal from a sensor, the signal generated as a function of a distance between the sensor and a belt in the tire and a tire characteristic; selecting a signal response curve from a plurality of signal response curves, the selected signal response curve representing the function of the distance between the sensor and the tire belt and the tire characteristic; determining from the response curve the distance between the sensor and the belt for the signal response received; buffing tread from the tire until the distance between the sensor and the belt reaches a final distance.

21 Claims, 10 Drawing Sheets

U.S. PATENT DOCUMENTS

| | | | |
|---|---|---|---|
| 5,067,539 | A | 11/1991 | Kinuhata et al. |
| 5,103,595 | A | 4/1992 | Dale et al. |
| 5,216,372 | A | 6/1993 | Zoughi et al. |
| 5,238,041 | A | 8/1993 | Tomita et al. |
| 5,307,854 | A | 5/1994 | Brewer |
| 5,941,338 | A | 8/1999 | Miller et al. |
| 6,005,397 | A | 12/1999 | Zoughi et al. |
| 6,086,452 | A | 7/2000 | Lipczynski et al. |
| 6,092,295 | A | 7/2000 | Parrish |
| 6,251,204 | B1 | 6/2001 | Andersson et al. |
| 6,386,024 | B1 * | 5/2002 | Marck et al. ............ 73/146 |
| 6,386,945 | B1 | 5/2002 | Fahringer et al. |
| 6,405,146 | B1 | 6/2002 | Engel |
| 6,745,809 | B1 * | 6/2004 | Mory et al. ............ 157/13 |
| 6,773,334 | B1 * | 8/2004 | Mallison ............ 451/38 |
| 7,040,371 | B2 | 5/2006 | Mory et al. |
| 2002/0088527 | A1 | 7/2002 | Tanaka et al. |
| 2002/0106252 | A1 | 8/2002 | Tsuzuki et al. |
| 2002/0170652 | A1 | 11/2002 | Parrish et al. |
| 2004/0073339 | A1 | 4/2004 | Ruoppolo |
| 2004/0200579 | A1 | 10/2004 | Mory et al. |
| 2007/0004319 | A1 | 1/2007 | Poling, Sr. et al. |
| 2010/0261412 | A1 | 10/2010 | Manuel et al. |

FOREIGN PATENT DOCUMENTS

| | | | |
|---|---|---|---|
| EP | 1946914 A1 | 7/2008 | |
| JP | 08-304009 A | 11/1996 | |
| JP | 2002-086586 A | 3/2002 | |
| JP | 2003-510188 A | 3/2003 | |
| JP | 2006-192795 A | 7/2006 | |
| WO | 01/23136 A1 | 4/2001 | |
| WO | 2005/014267 A1 | 2/2005 | |
| WO | 2007029501 A1 | 3/2007 | |

OTHER PUBLICATIONS

JP 2002-086586 A—English abstract and machine translation obtained from Espacenet (http://worldwide.espacenet.com) accessed on May 30, 2012, 13 pages.

PCT/US2007/065522 International Search Report and Written Opinion, Form PCT/ISA/237.

PCT/US2007/072376 International Search Report and Written Opinion, Form PCT/ISA/210/220.

PCT/US2007/072369 International Search Report, Form PCT/ISA/210/220.

PCT/US2007/065522 international Search Report, Form PCT/ISA 210.

JP 2003-510188 A—English abstract obtained from Espacenet (http://worldwide.espacenet.com) accessed on Feb. 3, 2012, 1 page.

PCT/US2007/072369 International Written Opinion, Form PCT/ISA/237 dated Dec. 5, 2007.

PCT/US2007/072500 International Search Report Form PCT/ISA/210 dated Aug. 19, 2008.

PCT/US2007/072500 International Written Opinion Form PCT/ISA/237 dated Aug. 19, 2008.

PCT/US2007/079954 International Search Report, Form PCT/ISA/220 dated Jul. 31, 2008.

PCT/US2007/079954 International Written Opinion, Form PCT/ISA/237 dated Jul. 31, 2008.

JP 2006-192795 A—English abstract obtained from Espacenet (http://worldwide.espacenet.com) accessed on Feb. 21, 2012, 1 page.

* cited by examiner

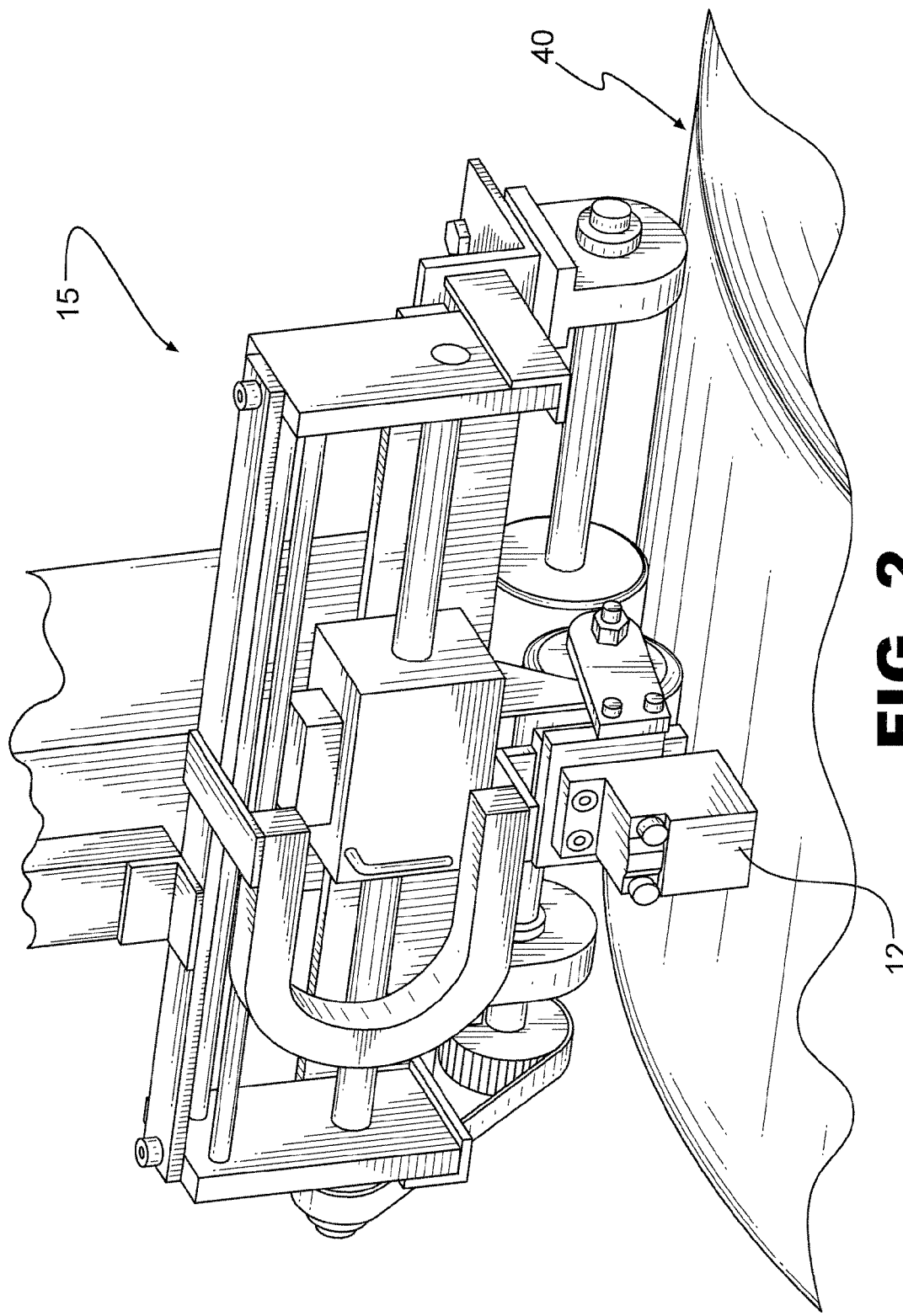

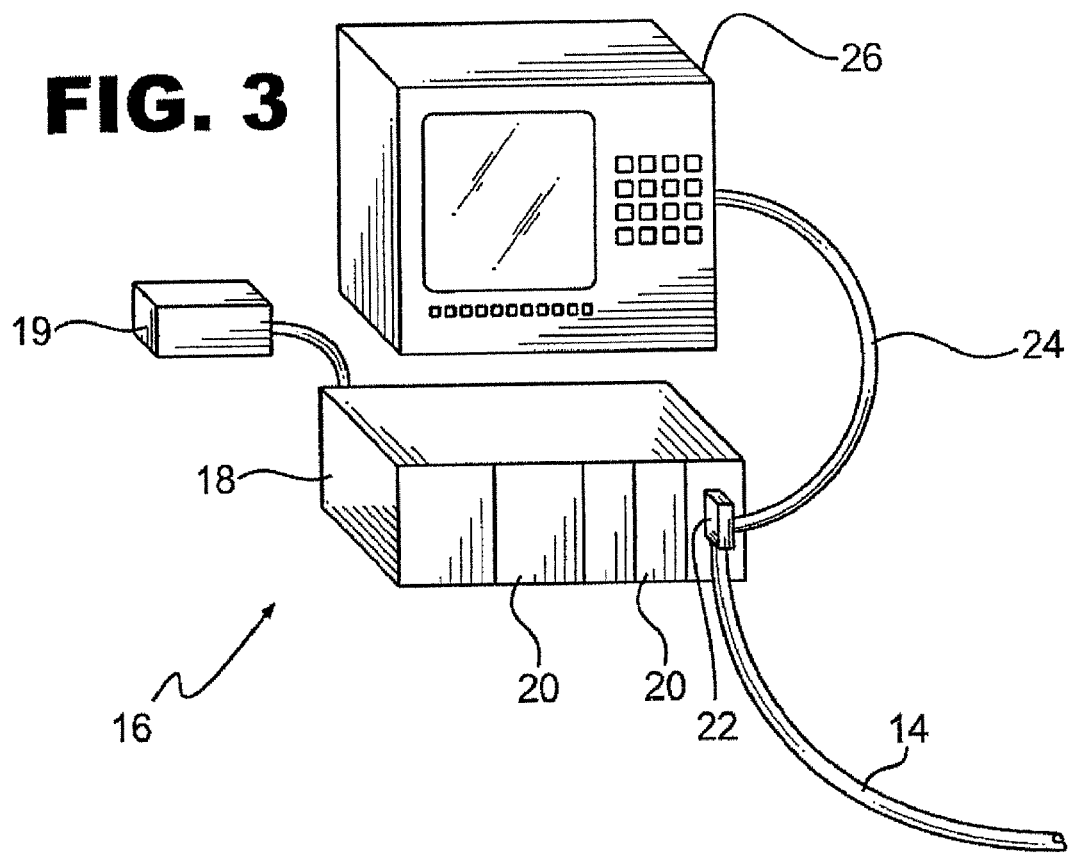
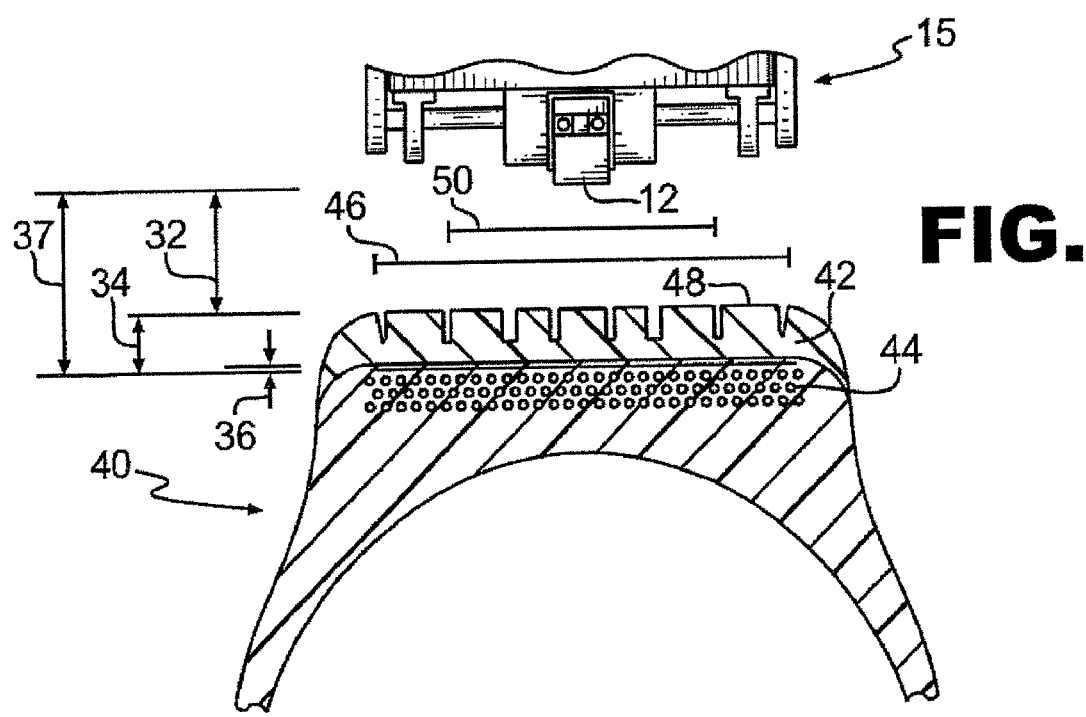

| | DISTANCE (mm) | RESPONSE SIGNAL (mamps) |
|---|---|---|
| 1 | 0 | 0.77 |
| 2 | 1 | 1.98 |
| 3 | 2 | 3.05 |
| 4 | 3 | 4.23 |
| 5 | 4 | 5.44 |
| 6 | 5 | 6.69 |
| 7 | 6 | 8.74 |

FIG. 5A

```
┌─────────────────────────────────┐
│        GERERATING A             │
│   SIGNAL RESPONCE CURVE         │
└─────────────────────────────────┘

┌─────────────────────────────────────┐
│  REMOVE A PORTION OF TIRE TREAD     │
│ TO SUBSTANTIALLY EXPOSE THE BELT    │
└─────────────────────────────────────┘
                  │
                  ▼
┌─────────────────────────────────────────┐
│ RECEIVE AT LEAST THREE SIGNAL RESPONSES │
│ FROM THE SENSOR AT DIFFERENT DISTANCES  │
│ FROM THE BELT WITH A DIFFERENT SPACER   │
│ PLACED BETWEEN THE SENSOR AND THE BELT  │
│    AT EACH OF THE DIFFERENT DISTANCES,  │
│   EACH SIGNAL GENERATED AS A FUNCTION   │
│         OF A DISTANCE BETWEEN           │
│         THE SENSOR AND THE BELT.        │
└─────────────────────────────────────────┘
                  │
                  ▼
┌─────────────────────────────────────────┐
│ GENERATE A SIGNAL RESPONSE CURVE USING  │
│     THE SIGNAL RESPONSES RECEIVED,      │
│    THE CURVE GENERATED AS A FUNCTION    │
│     OF SIGNAL RESPONSE AND DISTANCE.    │
└─────────────────────────────────────────┘
```

FIG. 11

RETREAD TIRE BUFFING WITH MULTIPLE RESPONSE CURVES

This is a national stage application of PCT/US2007/065522, filed Mar. 29, 2007, to which this application claims priority and the benefit of, the disclosure of which is also incorporated herein by reference.

BACKGROUND OF THE INVENTION

1. Field of the Invention

The invention relates to a machine and process for removing polymeric material, such as tread, from a tire carcass.

2. Description of the Related Art

Tires are known to comprise a tread consisting of an outer layer of rubber-based mixtures, of greater or lesser thickness, in which are molded various grooves and tread patterns intended, inter alia, to improve the vehicle's grip relative to the ground.

In certain cases, it is necessary to machine or remove the outer surface of the tire, for example, the tire tread, for the purpose of preparing a worn tire for retreading. Typically, tire tread removal has been accomplished by various types of abrading devices, such as rasps, grinding wheels, and wire brushes. Another process used for tire tread removal is a cutting process that utilizes a cylindrical cutter called a "peeler."

During the tread removal process, it may be desirable to monitor the amount of material remaining above the belt so that the removal device does not contact or damage the belt, which, if occurring would destroy the tire. Therefore, removal devices may use various types of sensors to monitor the amount of material remaining above the belt during the tread removal process. Such sensors are well known to those having ordinary skill in the art and an example of one is fully disclosed in U.S. Pat. No. 6,386,024.

SUMMARY OF THE INVENTION

A particular embodiment of the present invention includes a method of buffing tread from a tire carcass, the method comprising the steps of: receiving a signal response from a sensor, the signal response generated as a function of a distance between the sensor and a belt in the tire and a tire characteristic; selecting a signal response curve from a plurality of signal response curves, the selected signal response curve representing the function of the distance between the sensor and the tire belt and the tire characteristic; determining from the response curve the distance between the sensor and the belt for the signal response received; buffing tread from the tire until the distance between the sensor and the belt reaches a final distance.

An additional embodiment of the present invention includes a computer program including instructions embodied in a computer readable medium, the instructions comprising: receiving instructions for receiving a signal from a sensor, the signal generated as a function of a distance between the sensor and a belt in the tire and a tire characteristic; selecting instructions for selecting a signal response curve from a plurality of signal response curves, the selected signal response curve representing the function of the distance between the sensor and the tire belt and the tire characteristic; determining instructions for determining from the response curve the distance between the sensor and the belt for the signal response received; buffing instructions for buffing tread from the tire until the distance between the sensor and the belt reaches a final distance.

An additional embodiment of the present invention includes a tire buffing machine for buffing at least a portion of the tread from a tire carcass, the machine comprising: a sensor that provides a sensor output signal that is a function of a distance between the sensor and a belt of a tire; a controller comprising a processor and a memory storage device that stores instructions readable by the processor, including: receiving instructions for receiving a signal from a sensor, the signal generated as a function of a distance between the sensor and a belt in the tire and a tire characteristic; selecting instructions for selecting a signal response curve from a plurality of signal response curves, the selected signal response curve representing the function of the distance between the sensor and the tire belt and the tire characteristic; determining instructions for determining from the response curve the distance between the sensor and the belt for the signal response received; buffing instructions for buffing tread from the tire until the distance between the sensor and the belt reaches a final distance.

An additional embodiment of the present invention includes a method of generating a signal response curve as a function of the distance between a sensor and a tire belt and a tire characteristic comprising the steps of: receiving at least three signal responses from the sensor at different distances from the belt, each signal generated as a function of a distance between the sensor and the belt and a tire characteristic; generating a signal response curve using the signal responses received, the curve representing the function of the distances between the sensor and the belt and the tire characteristic.

These and other advantages will be apparent upon a review of the detailed description of the invention.

BRIEF DESCRIPTION OF THE DRAWINGS

FIG. 2 is a perspective view of a tire and sensor portion of the machine of FIG. 1;

FIG. 3 is a perspective view of a controller of the machine of FIG. 1;

FIG. 4 is a cross-sectional view of the tire and sensor portion of FIG. 2;

FIG. 5A is a table showing a plurality of signal responses with corresponding distances according to an embodiment of the invention;

DETAILED DESCRIPTION OF THE DRAWINGS

Figure 1:
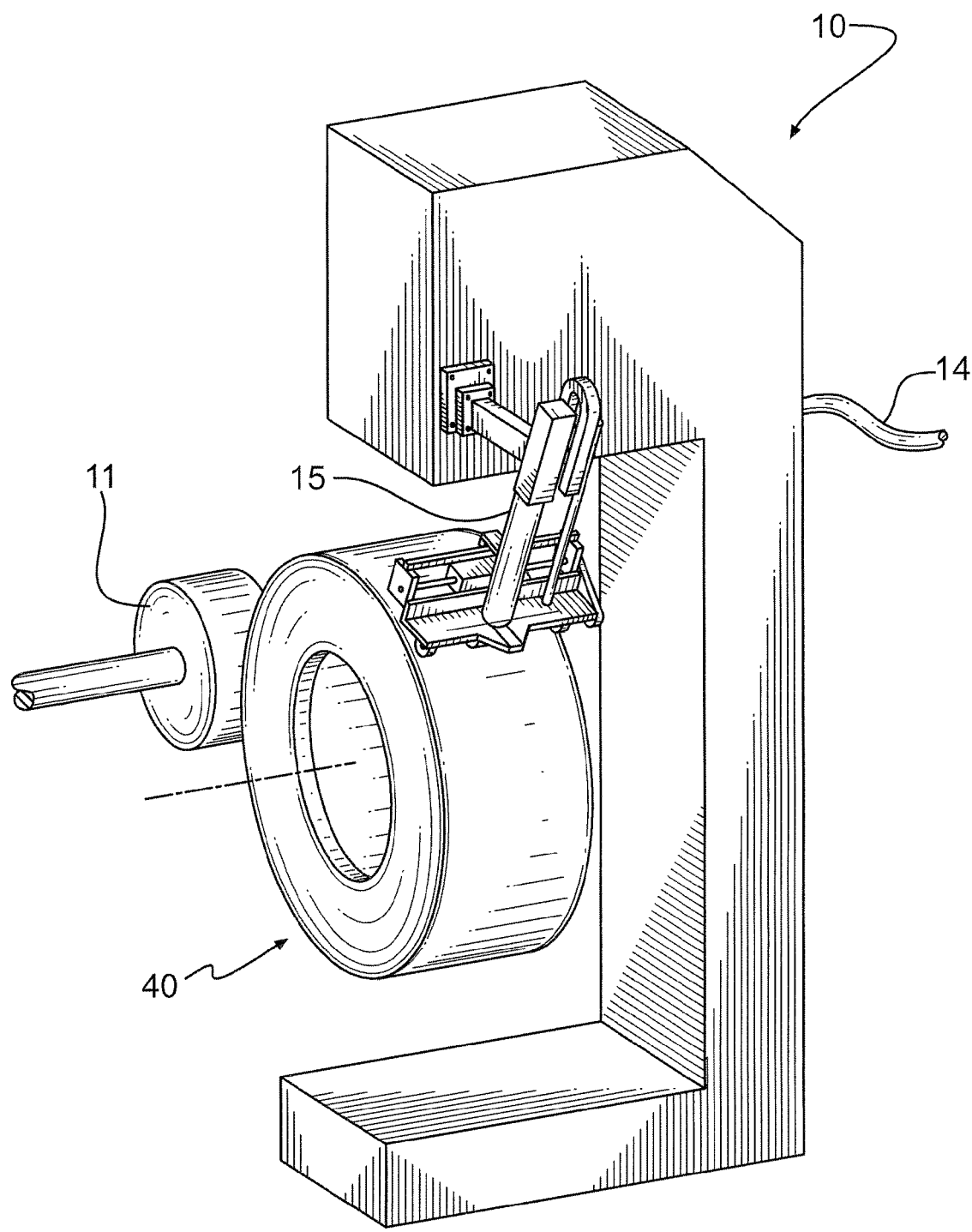
FIG. 1 is a perspective view of a polymeric material removal machine according to an embodiment of the invention.

FIGS. 1-4 disclose a tire buffing machine 10 that is adapted to more accurately remove tread 42 from a variety of tires 40 by using information specific to each tire variety.

Buffing machine 10 generally includes a tread removal tool 11, a belt sensor 12, a sensor mount 15, a sensor output 14, a programmable logic controller 16 or other device having a processor that can execute programmed instructions, such as, for example, a personal computer or main frame computer, and a user interface 26. Removal tool 11 removes tread 42 from tire 40, and may comprise any device capable of removing tread 42 from tire 40, including, without limitation, abrading devices, such as rasps, grinding wheels, and wire brushes, and cylindrical cutters or "peelers." It is contemplated that removal tool 11 may be used to remove material other than tread 42, for example, undertread.

Sensor 12 is generally used to monitor the amount of tread 42 being removed (or buffed) from tire 40, and to prevent any damage to belt 44. More specifically, sensor 12 measures the distance 37 between the sensor 12 and the belt 44 of tire 40. Sensor 12 is generally located radially above tread 42 and belt 44 of tire 40. In one embodiment, sensor 12 is located an offset distance 32 above tread 42 to prevent tread contact with sensor 12, and any damage resulting therefrom during the tread removal process. Sensor 12 may comprise an ultrasonic, magnetic, or inductive proximity sensor for measuring the distance between sensor 12 and belt 44. However, it is contemplated that any other sensor type may be used, including those capable of locating non-ferrous cord material. In operation, sensor 12 generates a signal response as a function of the distance 37 between the sensor 12 and the tire belt 44. The signal response may be represented by a value, which may represent current, voltage, resistance, or any other characteristic of the signal response. Ultimately, the signal is sent to the programmable logic controller 16 by way of input/output (I/O) cable 14 for evaluation and processing. Without limitation, the signal may also be sent by infrared signal, by radio frequency, by one or more cables, including fiber optics, or any other method known to those having ordinary skill in the art.

Programmable logic controller 16 generally receives signal responses from sensor 12 to monitor and help control the amount of tread 42 being removed from tire 40. More specifically, controller 16 may utilize signal-distance functions or tables (i.e., signal response curves 38) to convert a signal response into a corresponding distance. Further, controller 16 may also be used to calibrate the sensor position and generate signal response curves, and/or instruct the machine 10 to perform an operation. Controller 16 includes a logic processor 18, which may be a microprocessor, a memory storage device 19, such as RAM (random access memory), ROM (read-only memory), PROM (programmable read-only memory), and at least one input/output (I/O) cable 14 for communicating with buffing machine 10. Further, controller may include an I/O slot 20 for housing an I/O card having I/O cable connector 22.

An operator may utilize a user-interface 26 to monitor the sensor measurements and to program, or otherwise control or instruct, the operation of controller 16 and buffing machine 10. User-interface 26 and controller 16 may communicate by way of I/O cable 24. It is also contemplated that wireless communications may exist between controller 16, user-interface 26, and machine 10. Generally, controller 16 may be programmed by any known graphical or text language. Programmed instructions, data, input, and output may be stored in a memory storage device 19, which is accessible to processor 18. Memory device 19 may comprise any commercially known storage device, such as such as hard disk drives, optical storage devices, flash memory, and the like. Processor 18 executes programmed instructions and may perform the distance calculations and measurements, as wells as other operations, discussed herein. Memory storage device 19 also stores inputs, outputs, and other information, such as, for example, functions and tables 39 representing signal response curves 38, for use by processor 19 in performing its operations. In addition to performing distance conversions and measurements, controller 16 may also be programmed to generate signal response curves 38, including tables 39, based upon received input.

Figure 5:
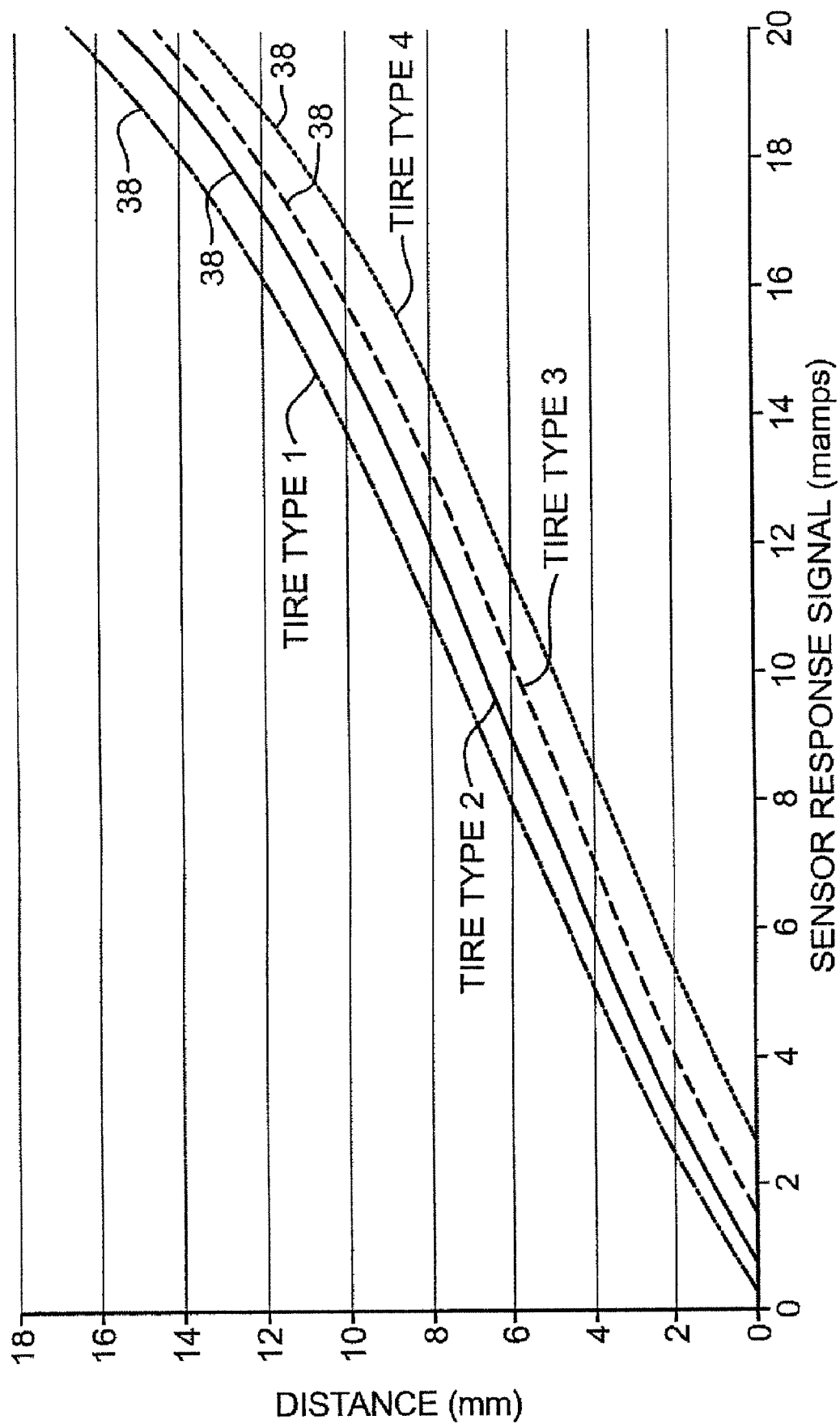
FIG. 5 is a graph showing a plurality of signal response curves according to an embodiment of the invention.

With reference to FIGS. 5 and 5A, signal response curves 38 are used by controller 16 to convert signal responses into distances. Signal response curves 38 are generally functions of the distance 37 between sensor 12 and belt 44, and relate a signal response to a distance. Signal response curves 38 may, for example, be stored in a memory storage device 19 as one or more equations or as a table 39, which provides a plurality of signal responses and corresponding distances 37. The one or more equations are mathematical expressions of the function. Since the function is typically not linear over the entire range of the signal response signal, a series of equations may be used that are linear over a given range of the sensor response signals.

After receiving the signal and its value, a corresponding distance may be determined from a signal response curve 38 by processor 18. More specifically, in one embodiment, the distance is determined from a function that represents signal response curve 38, which may be linear or non-linear. In another embodiment, the distance is determined from a table 39, by locating from the table the two signal responses closest in value to the signal response received and then obtaining a linear relationship between the two signal responses and their corresponding distances. From the linear relationship, a distance is determined for the signal response received. The linear relationship may comprise a linear function or may be based upon a percentage or ratio relating the signal received to range between the two points selected from the table. If, by chance, the signal response received is substantially equivalent to a signal response within a table 39, the corresponding distance may also represent the distance of the received signal response. Because signal responses may vary from tire to tire, a plurality of signal response curves 38 are provided, where each response curve 38 represents a tire or a plurality of tires sharing a common tire characteristic, such as, for example, a tire size, shape, construction, manufacturer or brand, or a tread profile. Consequently, to more accurately control tread measurement and removal, processor 18 selects a signal response curve 38 based upon a known tire characteristic, or based upon certain information or instructions received from an operator. Signal response curves 38, as functions or as tables 39, are generally stored in a memory storage device 19 and used by the processor 18 to determine the distances according to programmed instructions reflecting the above stated methods.

Figure 6:
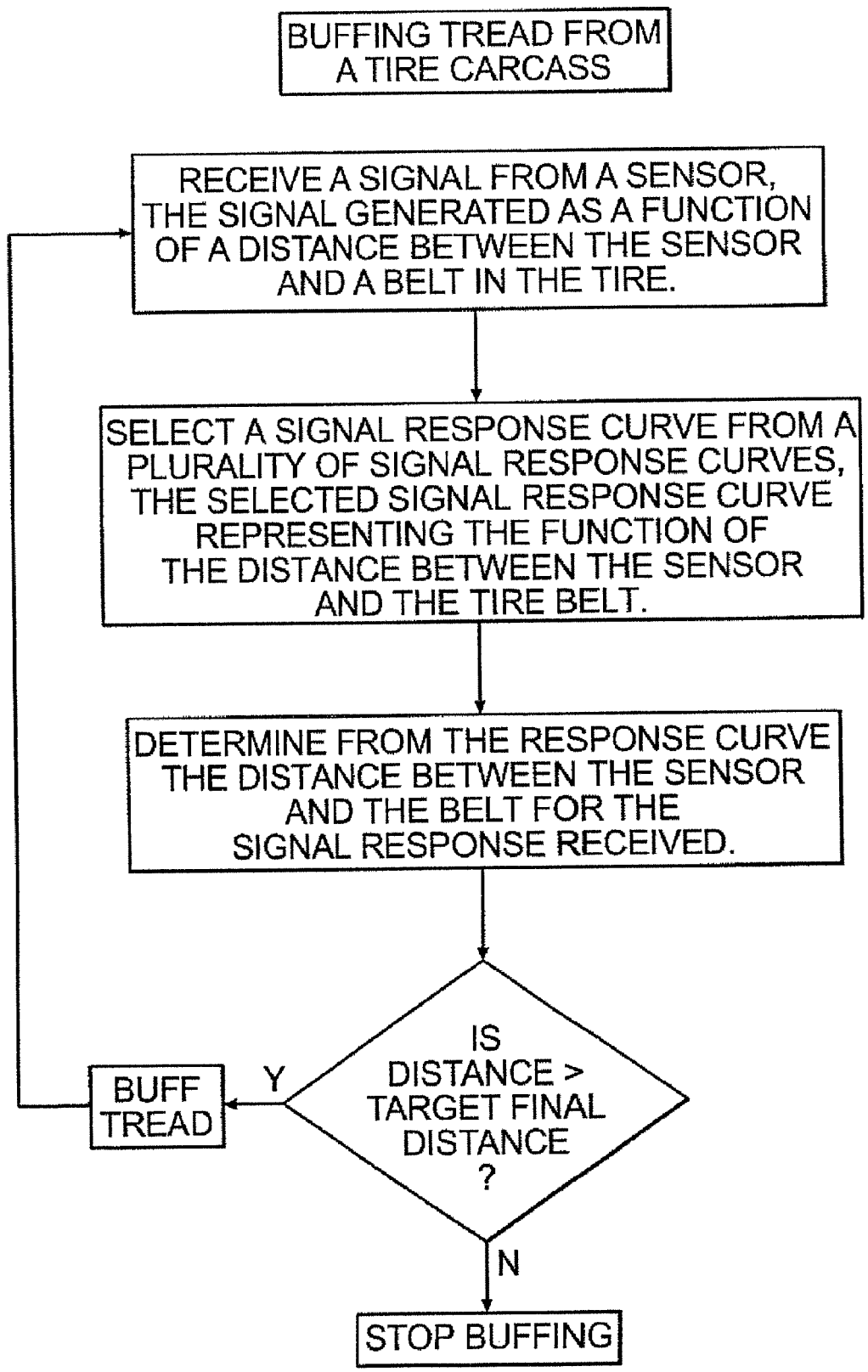
FIG. 6 is a flow chart showing a method of removing material from a tire according to an embodiment of the invention.

In operation, sensor 12 is aligned above the tread 42 and belt 44 (i.e., radially outward of tire), and may be placed at any location across the belt width 46 to monitor the tread thickness (i.e., depth or gauge) 34 in conjunction with tread removal, as described in FIG. 6. More specifically, sensor 12 generates a signal corresponding to the distance 37 between sensor 12 and belt 44. The signal is converted to a distance from a selected signal response curve 38. If the sensor is not offset from the tread, the signal response is equivalent to the tread thickness 34. If the sensor is located an offset distance 32 radially away from tread 42, the signal response is equivalent to the offset distance 32 and the tread thickness 34. The sensor 12 may be located away from the tread 42 to protect the sensor from becoming damaged during the tread removal process.

A target final tread thickness, or set point, (i.e., gauge) 36 may be provided to protect belt 44 from being inadvertently damaged by removal tool 11. Because the tread thickness 34 is generally unknown, tread thickness 34 is determined by subtracting the offset distance 32 from the distance 37 between sensor 12 and belt 44 (i.e., the distance corresponding to the signal response). Once determining the tread thickness 34, the amount of tread to be removed can be determined by subtracting the target final distance 36 from the tread thickness 34. The amount to be removed is then subtracted from the distance between the sensor and belt to provide a final sensor distance 39, which provides a tire tread 42 having a target final thickness 36. It is contemplated the sensor may monitor tread removal continuously or intermittently throughout the tread removal process, at one or more locations across the tread. Once the final thickness 36 is reached, the tread removal operation terminates. Because the characteristics of the belt vary across its width, especially at the outermost portions of the belt width, it may be desirous to limit the use of sensor 12 to certain portions of belt width 46. In one embodiment, sensor 12 is only used to monitor tread removal within the inner most 80% of belt width 46.

Because buffing machine 10 is exposed to vibrations and other dynamic loads, buffing machine 10 is susceptible to wear and misalignment. If sensor 12 is maintained an offset distance 32 from the tire, any wear or misalignment may cause the offset distance 32 to change. As a result, the accuracy of tread removal may be reduced since the offset distance 32 may be used to determine the tread thickness 34, and consequently, the amount of tread to remove. Further, if removal tool 11 over-travels the tread and reaches the belt, the belt becomes damaged and the tire discarded. Therefore, the machine 10 may be calibrated periodically to determine the present offset distance 32 to better maintain accuracy and control of tread removal.

Figure 7:
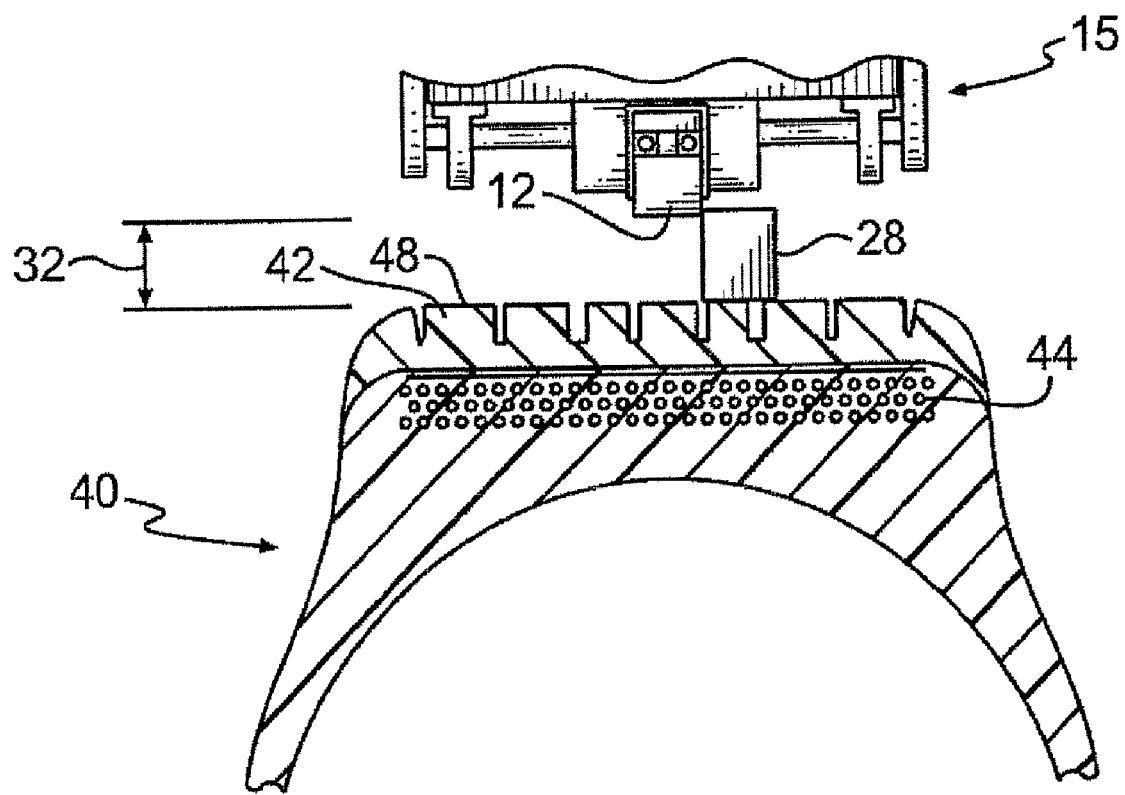
FIG. 7 is a cross-sectional view of a tire and sensor portion of the machine of FIG. 1 with a second calibration sensor, according to an embodiment of the invention.
Figure 8:
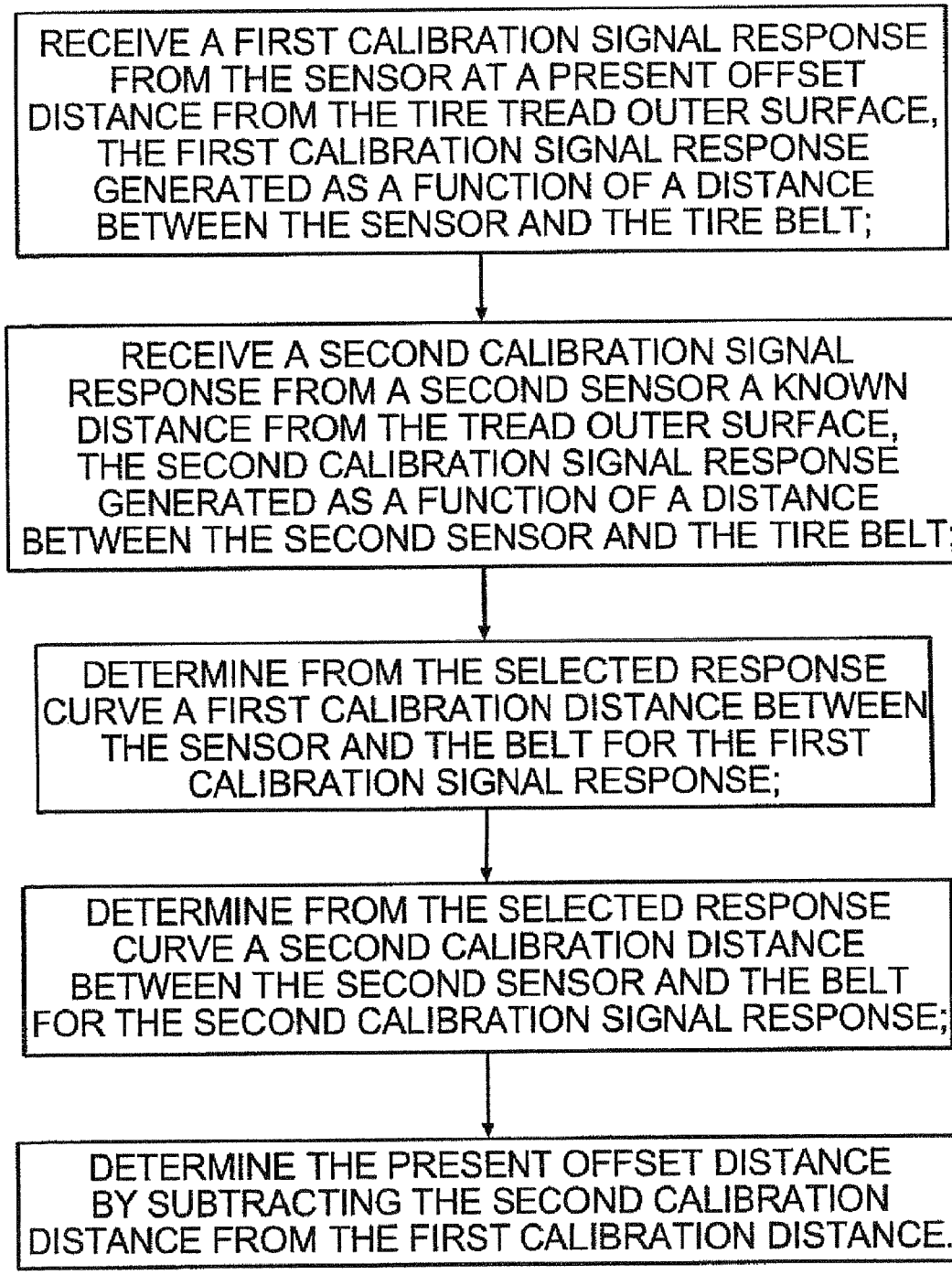
FIG. 8 is a flow chart showing a method of calibrating the sensor of the machine in FIG. 1, according to an embodiment of the invention.

In one embodiment, as shown in FIGS. 7-8, a first calibration signal response is generated from sensor 12 at the present offset distance 32 from the tire tread outer surface 48, the first calibration signal response being generated as a function of a distance between the sensor and the tire belt. A second calibration signal response is also generated from a second sensor 28 at a zero distance from the tread 42 (i.e., at the tread outer surface 48), the second calibration signal response being generated as a function of a distance between the second sensor and the tire belt. The second sensor 28 may be located at or near the location along the tire tread from which the first calibration signal was generated, in an effort to obtain the tread thickness corresponding to the first calibration signal and location. For example, the second sensor 28 may be adjacent to sensor 12, such as laterally (as shown in FIG. 7) or circumferentially. Both the first calibration distance and the second calibration distance are converted to a first calibration distance and a second calibration distance, respectively, by using the signal response curve applicable to the present tire. The present offset distance 32 is then determined by subtracting the second calibration distance from the first calibration distance. This process, in whole or in part, may be performed manually by an operator, by machine 10, and/or controller 16.

Figure 9:
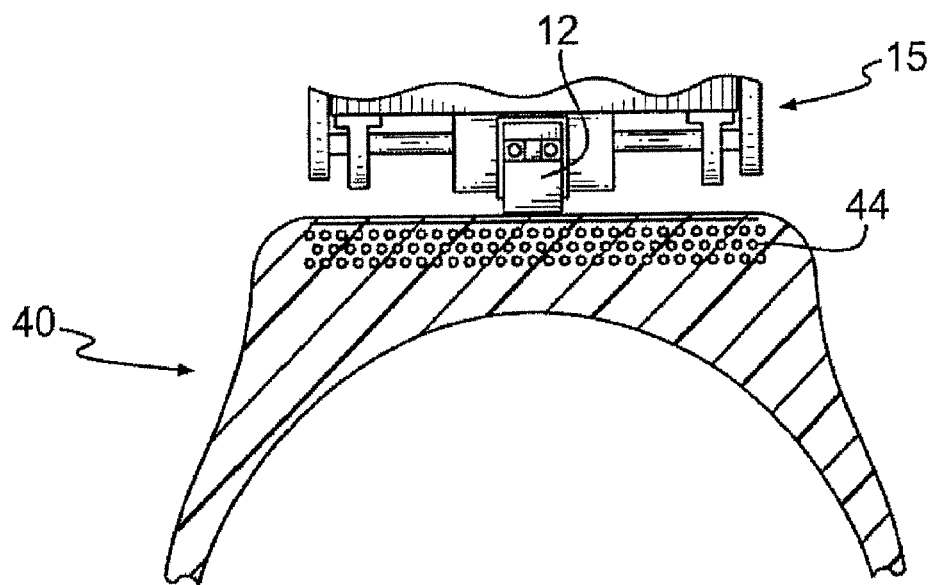
FIG. 9 is a cross-sectional view of a tire and sensor portion of the machine of FIG. 1, showing a step in generating a signal response curve in accordance with an embodiment of the invention.
Figure 10:
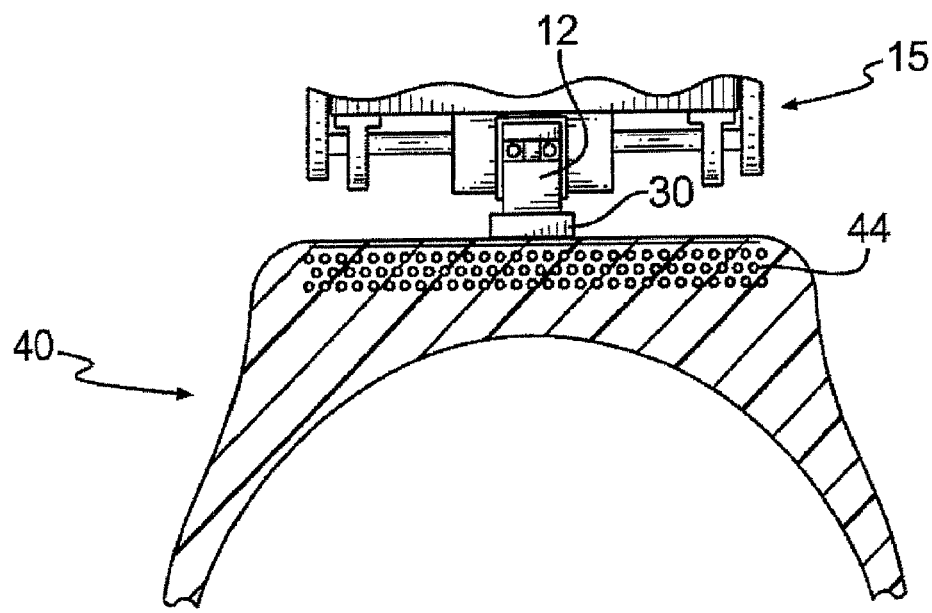
FIG. 10 is a cross-sectional view of a tire and sensor portion as shown in FIG. 9, showing a step in generating a signal response curve in accordance with an embodiment of the invention; and, FIG. 11 is a flow chart showing a method of generating a signal response curve in accordance with an embodiment of the present invention.

Referring to FIG. 5, as mentioned above, signal response curves 38 are functions of the distance 37 between sensor 12 and belt 44. Further, each curve 38 is also a function of a particular tire characteristic. With reference to FIGS. 9-11, each signal response curve 38 or table 39 may be generated by obtaining response signals, typically 3 or more, at different known distances from belt 44 of a tire 40, the tire 40 having a known tire characteristic. Obtaining at least three different response signals at known distances (or three data points) facilitates generation of a non-linear function (i.e. a signal response curve 38), assuming the data points provide for a non-linear curve.

In one embodiment, a portion of the tread 42 is removed to expose the top of belt 44, and the sensor 12 is placed atop the belt 44 to generate a signal response at a zero distance above belt 44 (i.e, the tread outer surface 48). Other signal responses may be generated at other distances from the belt 44, or, if the belt 44 is not exposed, the tread 42. These other distances may be generated at certain intervals, such as, for example, one millimeter intervals, or at any independent and arbitrary known distance. Because the resulting signal response curve 38 or table 39 may be used to convert response signals from a range of distances (the expected distance range), signal responses may be measured at distances located at or near the upper and lower limits of the expected distance range. For example, the thickest tread 42 expected to be removed from a tire may be 10 millimeters (mm) thick (i.e., the tread gauge) with the sensor 12 offset by 5 mm. The expected final thickness of the material remaining above the belt (i.e., the tread) 36 may be 1 mm. Therefore, the upper limit of the signal response curve 38 for the exemplary tire would be 17 mm (tread thickness 34 plus offset distance 32), while the lower limit would be 6 mm (the final thickness 36 plus the offset distance 32, assuming sensor 12 remains at the offset distance 32 throughout the tread removal process). Because the characteristics of belt 44 generally change with the width of the belt 46, and because signals may respond differently with belt variations, a signal response curve 38 may only be applicable to certain portions of the belt width 46, such as, for example, the inner most 80% of the belt width 50. Variation at the outer limits of belt 44 (i.e., approaching the full belt width) is generally the result of tire design and curing, including, for example, the specific belt and cap designs and the cured tread profiles (i.e., the amount of crowning or arcing across the tread width).

The process of obtaining signal responses to generate a signal response curve 38 may be improved by using spacers 30. A spacer or spacers 30 may be placed between the sensor 12 and the belt 44 or tread 42, for the purpose of more accurately locating the sensor 12 a known distance away from the belt 44 or tread 42. This may also improve the overall efficiency of the process over manual techniques. Spacers 30 may generally be of any thickness to place the sensor at any desired distance from the belt 44 or tread 42. In one embodiment, spacers 30 are 1mm thick, and may be stacked to obtain distances that are integer multiples of 1 mm. It is also contemplated that a plurality of spacers 30 having different thicknesses may be used, which may also provide distances at desired intervals or increments. Spacers 30 may be made of any non-ferrous material, such as rubber, plastic/polymer, or paper, so not to interfere with the response signals of certain types of sensors 12 (e.g., magnetic or inductive sensors). In one embodiment, spacers 30 are made of ceramic material. In lieu of using spacers 30 and any manual technique, it is contemplated that the machine 10 may be programmed to step sensor 12 away from the belt or tire at known distances to obtain signal responses to generate curve 38.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of buffing tread from a tire carcass, the method comprising the steps of:
   receiving a signal response from a sensor, the signal response generated as a function of a distance between the sensor and a belt in the tire and a tire characteristic;
   selecting a signal response curve from a plurality of signal response curves, the selected signal response curve representing the function of the distance between the sensor and the tire belt and the tire characteristic;
   determining from the response curve the distance between the sensor and the belt for the signal response received;
   buffing tread from the tire until the distance between the sensor and the belt reaches a final distance.

2. The buffing method of claim 1, further comprising:
   receiving a tire characteristic input identifying the tire characteristic;
   using the tire characteristic input to select the signal response curve from the plurality of signal response curves.

3. The buffing method of claim 1, further comprising:
   receiving an instruction to select a signal response curve from the plurality of signal response curves.

4. The buffing method of claim 1, wherein the tire characteristic is selected from a tire manufacturer, a tire construction, a tire brand, a tire size, a tire shape, a tread profile or combinations thereof.

5. The buffing method of claim 1, wherein the signal response curve is in the form of a table, the table containing a plurality of signal responses with corresponding distances.

6. The buffing method of claim 5, the step of determining the distance between the sensor and the belt for a signal response received comprises determining the distance from a linear relationship between two response signals selected from the plurality of response signals in the table that are closest in value to the signal response received.

7. The buffing method of claim 1, wherein the sensor is located an offset distance outward the tread outer surface, the final distance being approximately equivalent to a final amount of material remaining above the tire belt and the offset distance.

8. The buffing method of claim 7, further comprising:
   comparing a second sensor response with the sensor signal response;
   calibrating the sensor signal response with the second sensor response 9. The buffing method of claim 7, further comprising:
   receiving a first calibration signal response from the sensor at a present offset distance from the tire tread outer surface, the first calibration signal response generated as a function of a distance between the sensor and the tire belt;
   receiving a second calibration signal response from a second sensor at a zero distance above the tread, the second calibration signal response generated as a function of a distance between the second sensor and the tire belt;
   determining from the selected response curve a first calibration distance between the sensor and the belt for the first calibration signal response;
   determining from the selected response curve a second calibration distance between the second sensor and the belt for the second calibration signal response;
   determining the present offset distance by subtracting the second calibration distance from the first calibration distance.

10. The buffing method of claim 9, in the steps of receiving a first and second calibration signal response, the first and second calibration signal responses being generated at or in close proximity to the same location along a tread of the tire.

11. A computer program including instructions embodied on a computer readable medium, the instructions comprising:
   receiving instructions for receiving a signal response from a sensor, the signal response generated as a function of a distance between the sensor and a belt in the tire and a tire characteristic;
   selecting instructions for selecting a signal response curve from a plurality of signal response curves, the selected signal response curve representing the function of the distance between the sensor and the tire belt and the tire characteristic;
   determining instructions for determining from the response curve the distance between the sensor and the belt for the signal response received;
   buffing instructions for buffing tread from the tire until the distance between the sensor and the belt reaches a final distance.

12. The buffing method of claim 11, wherein the tire characteristic is selected from a tire manufacturer, a tire construction, a tire brand, a tire size, a tire shape, a tread profile.

13. The buffing method of claim 11, wherein the signal response curve is in the form of a table, the table containing a plurality of signal responses with corresponding distances.

14. The buffing method of claim 11 further comprising:
   receiving instructions for receiving a tire characteristic input identifying the tire characteristic; and
   using instructions for using the tire characteristic input to select the signal response curve from the plurality of signal response curves.

15. A tire buffing machine for buffing at least a portion of the tread from a tire carcass, the machine comprising:
   a sensor that provides a sensor output signal that is a function of a distance between the sensor and a belt of a tire;
   a controller comprising a processor and a memory storage device that stores instructions readable by the processor, the instructions comprising:
   receiving instructions for receiving a signal response from a sensor, the signal response generated as a function of a distance between the sensor and a belt in the tire and a tire characteristic;
   selecting instructions for selecting a signal response curve from a plurality of signal response curves, the selected signal response curve representing the function of the distance between the sensor and the tire belt and the tire characteristic;
   determining instructions for determining from the response curve the distance between the sensor and the belt for the signal response received;
   buffing instructions for buffing tread from the tire until the distance between the sensor and the belt reaches a final distance.

16. The tire buffing machine of claim 15, the sensor being a magnetic proximity sensor.

17. A method of generating a signal response curve as a function of the distance between a sensor and a tire belt and a tire characteristic, the method comprising the steps of:

receiving a signal response from the sensor at different distances from the belt, each signal generated as a function of a distance between the sensor and the belt and a tire characteristic;

generating a signal response curve using the signal responses received, the curve representing the function of the distances between the sensor and the belt and the tire characteristic.

18. The signal generating method of claim 17, further comprising:

removing a portion of tire tread to substantially expose the belt.

19. The signal generating method of claim 17, wherein the step of receiving further comprises:

placing at least one spacer between the sensor and the tire at each of the different distances.

20. The signal generating method of claim 17, the step of receiving a signal at different distances further comprises:

receiving a signal from a first distance located in close proximity to the belt, and a second distance approximately equivalent to an offset distance between the sensor and the tire and an initial gauge of material above the belt.

21. The signal generating method of claim 17, wherein the step of generating a signal response curve comprises:

generating a table using the signal responses received, the table containing a plurality of signal responses with corresponding distances, the distances representing the distance between the sensor and the belt.

* * * * *